United States Patent [19]

Masek et al.

[11] Patent Number: 5,904,351
[45] Date of Patent: May 18, 1999

[54] METHOD AND APPARATUS FOR DESENSITIZING PRINT MEDIA ON A PRINT DRUM TO THE EFFECTS OF DEBRIS CONTAMINATION AND AIR TURBULENCE

[75] Inventors: William S. Masek, North Attleboro; Walter P. Haimberger, Topsfield; George D. Whiteside, Lexington; Richard A. Rosenthal, Winchester, all of Mass.

[73] Assignee: Sterling Dry Imaging Systems, Inc., Glasgow, Del.

[21] Appl. No.: 08/679,020

[22] Filed: Jul. 12, 1996

Related U.S. Application Data

[63] Continuation-in-part of application No. 08/533,617, Sep. 25, 1995, Pat. No. 5,772,203.
[51] Int. Cl.⁶ .................................................. B65H 5/02
[52] U.S. Cl. ........................................... 271/277; 271/314
[58] Field of Search .................................. 271/275–277, 271/314; 101/408, 409, 410, 411, 412, 475

[56] References Cited

U.S. PATENT DOCUMENTS

| 4,390,176 | 6/1983 | Kato | 271/277 X |
| 4,903,957 | 2/1990 | Binder et al. | 271/277 |
| 5,516,096 | 5/1996 | Whiteside | 271/277 |
| 5,772,203 | 6/1998 | Masek et al. | 271/275 |

*Primary Examiner*—David H. Bollinger
*Attorney, Agent, or Firm*—Joseph T. Guy, Jr.

[57] ABSTRACT

The present invention discribes a rotatable print drum apparatus for supporting thereon a printable medium having leading and trailing edges. The print drum comprises a relieved support surface for supporting the print medium wherein the relieved surface is formed with a recessed surface and a plurality of ribs protruding from the recessed surface in order to minimize contact of the print medium with the support surface of the drum.

3 Claims, 7 Drawing Sheets

METHOD AND APPARATUS FOR DESENSITIZING PRINT MEDIA ON A PRINT DRUM TO THE EFFECTS OF DEBRIS CONTAMINATION AND AIR TURBULENCE

CROSS-REFERENCE TO RELATED APPLICATION

The present invention is a continuation-in-part application related to U.S. patent application Ser. No. (08/533,617) filed Sep. 25, 1995, now U.S. Pat. No. 5,772,203 entitled "METHOD AND APPARATUS FOR DESENSITIZING PRINT MEDIA ON A PRINT DRUM TO THE EFFECTS Of DEBRIS CONTAMINATION AND AIR."

BACKGROUND OF THE INVENTION

The present invention relates generally to securing a sheet medium onto a support surface and, more particularly, to a method and apparatus for supporting a flexible film sheet medium on a relieved support surface of a print drum which desensitizes the systems to the effects of contamination and air turbulence for allowing the sheet to be imprinted with improved resolution.

A wide variety of sheet processing systems has been proposed for effecting clamping of a sheet medium onto a cylindrical surface of a rotatable print drum. For example, in facsimile machines, computer printers, and xerographic copiers, there are requirements for releasably clamping and wrapping a sheet medium to and about a rotary drum, whereby the medium can be imprinted while the drum is rotating. In general, the rotary drums of the above devices are rotated at relatively slow speeds, for example, in the order of about 10–100 rpm. However, with the advent of high speed digital dry laser imaging processes, such as the type commercially available from Polaroid Corporation of Cambridge, Mass., USA for use in obtaining high-quality radiographic images, there is a requirement that the film or medium be printed while being rotated at high speeds, such as in the order of about 1200 to 6000 rpm in order to produce images within the commercially accepted time frame of conventional techniques.

Another requirement is that the sheet being imaged remain in a preferred wrapped position for insuring the degree of image resolution required in the medical field. For example, one consequence of a sheet being misaligned or spaced from its desired wrapped position is that the quality of the resolution can be compromised significantly. This is especially critical with, for instance, radiological images of the medical type. It is evident that even minor deviations of a sheet from its intended wrapped position may cause unacceptable medical images.

The potential for a sheet deviating from its intended wrapped condition during digital imaging of the above type becomes even more significant whenever the size of the sheet to be printed increases. This is so because the larger format film sheets must be rotated at higher speeds so that they can be imprinted with considerably more information within the same general time frame as the smaller format sheets having less information. Because of increases in rotational speeds, there are increases in centrifugal forces acting on the sheet. If the film sheet bulges or otherwise separates from the drum surface irregularly, then the printing laser head, which automatically moves toward and away from the sheet during printing in an effort to maintain the laser head at its desired focal plane distance to the print surface, will not be able to move or track in and out fast enough to maintain the desired focal distance. As a consequence, the rendered radiological images can be less than satisfactory. This tends to create problems with the sheet separating radially.

The problem with sheet profile deviation such as bulging may be further aggravated when dirt or other contamination is present on the drum surface or on the medium. The dirt or contamination may be in the form of minute dust particles which cause a localized disturbance in the medium. In particular, such dust particles can create so-called tenting issues, whereby the media is disturbed from a smooth profile such as being sloped or inclined from the dust particles. Such tenting in effect magnifies the disturbances to the desired media shape when wrapped. It also has been further determined that air turbulence over and under the sheet will cause the media shape profile to change undesirably.

One known approach for clamping a flexible sheet of dry laser imaging film onto a cylindrical surface of a rotatable drum, so as to be imprinted by a laser, is described in commonly assigned U.S. Pat. No. 4,903,957, issued Feb. 27, 1990. This patent discloses use of leading and trailing edge clamps which are mounted axially on a rotatable drum and are sequentially operated by external cams to clamp and release both the leading and trailing edges of the flexible sheet that is to be wrapped on a rotating drum. Efforts have been undertaken to maintain the media shape on the drum. In this regard, some of the clamps proposed tend to minimize the radial separation of the sheet by clamping the sheet so that it is tightly wrapped on portions of the drum surface. An example of such latter clamping is described in U.S. Pat. No. 5,516,096, which is incorporated herein as a part hereof.

While the foregoing approaches are satisfactory, there is nevertheless a desire to improve upon printing performance by reducing sensitivity of the media and thus the autofocus to dust and debris and air turbulence that causes displacement of the media from a desired shape, especially in situations where high rotational speeds are to be encountered.

SUMMARY OF THE INVENTION

In accordance with the invention, provision is made for an improved method and apparatus for supporting a print medium on a print drum. The print drum has a relieved surface formed with a plurality of ribs protruding from a recessed skin in order to minimize the surface area of the print drum in contact with the print medium and thus the likelihood of dirt becoming entrained between the medium and the drum surface.

In an illustrated embodiment, provision is made for lands extending transverse on the drum and to the medium near opposite ends to allow even clamping support of the medium near the ends and to prevent air circulation between the medium and the support surface.

According to an aspect of the invention, the ribs are circumferential and spaced apart along the central rotational axis of the drum. In a particular exemplary embodiment, the ribs extend above the recessed skin surface a radial distance in a range of several thousandth of an inch. In an illustrated embodiment the radial range is about 0.007 to about 0.017 inch.

In another aspect of the invention, the ribs provide support for the medium and comprise at least about 1 percent of the surface area of the print drum in the image field of the film.

In accordance with another aspect of the invention, provision is made for an improved method of an apparatus for securing flexible sheet material to a rotatable supporting device which has been desensitized to the effects of contamination and air turbulence.

In an illustrative embodiment, provision is made for a method of and apparatus for automatically clamping a flexible sheet medium to a rotatable relieved supporting surface comprising a plurality of circumferential ribs and raised lands protruding from a recessed skin for reducing sensitivity of the media to contamination of dirt and dust between the medium and the surface and for reducing air turbulence on the wrapped medium. The raised ribs support the medium above the skin and the raised lands provide a uniform clamping surface which also prevent air flow under the medium.

In another embodiment of the invention, a transition ramping surface is located between the lands and the recessed skin for facilitating feeding of the film's leading edge onto the print drum.

In another illustrative embodiment, provision is made for a method of and apparatus for automatically clamping flexible sheet material on a relieved rotatable supporting surface having spaced apart upstanding ribs with free medium supporting surfaces and transverse lands extending from the recessed surface. In the arrangement, clamping forces independently increase as a function of the rotational speed of the support surface so as to assist in maintaining control of the film shape. Included in the method are the steps of mounting a flexible sheet medium onto the rotatable supporting surface; and, clamping first and second opposed edges of the sheet at the lands so as to wrap it on the support surface. The lands are coplanar with the free surface of the ribs and tangential ramp portions smoothly join the lands with the recessed surface.

In addition, the method includes applying a clamping force to the sheet edge near the land so that the clamp does not bend or push the sheet away from the clamp pivot axis to thereby prevent buckling or bulging of the medium from its precision wrapped position against the free surfaces of the ribs.

Another illustrative embodiment allows the clamps to slip relative to and on the film surface, such that the clamps exert gentle forces on the surface of the film to pull the film tightly to the drum, but creates no motion of the film relative to the drum occurs.

Among the other objects of the present invention are, therefore, the provision of a print drum for a medium having a relieved support surface for desensitizing the medium and drum system to contamination by dirt and debris.

Another object of the invention is the provision for ribs extending from the relieved surface to support the medium thereabove.

Another object of the invention is the provision for lands extending transverse to the medium near opposite ends to allow even clamping support of the medium near said ends and to prevent air circulation between the medium and the support surface.

In yet another object of the invention is the provision of a tangential ramp between the relieved surface and the land to promote feeding of the leading edge of the medium as it engages the print drum prior to clamping.

Still another object of the invention is to clamp a sheet of film medium to a dirt desensitized rotary drum in a manner whereby as centrifugal and air turbulence forces increase, the medium clamping forces are applied evenly to the edge of the sheet and increase in such a way that bulging or buckling of the medium is prevented.

Another object of the invention is to avoid formation of disturbances between the drum and the sheet of a nature which will cause a laser head to be out-of-focus during printing, whereby inaccurate printing information results.

Another object of the invention is to have the clamp slide relative to the film during cinching.

Other objects and advantages of the present invention will become apparent from the following more detailed description thereof when taken in conjunction with the accompanying drawings in which like structure is represented by like reference numerals throughout the several views.

DESCRIPTION OF THE INVENTION

Figure 7:
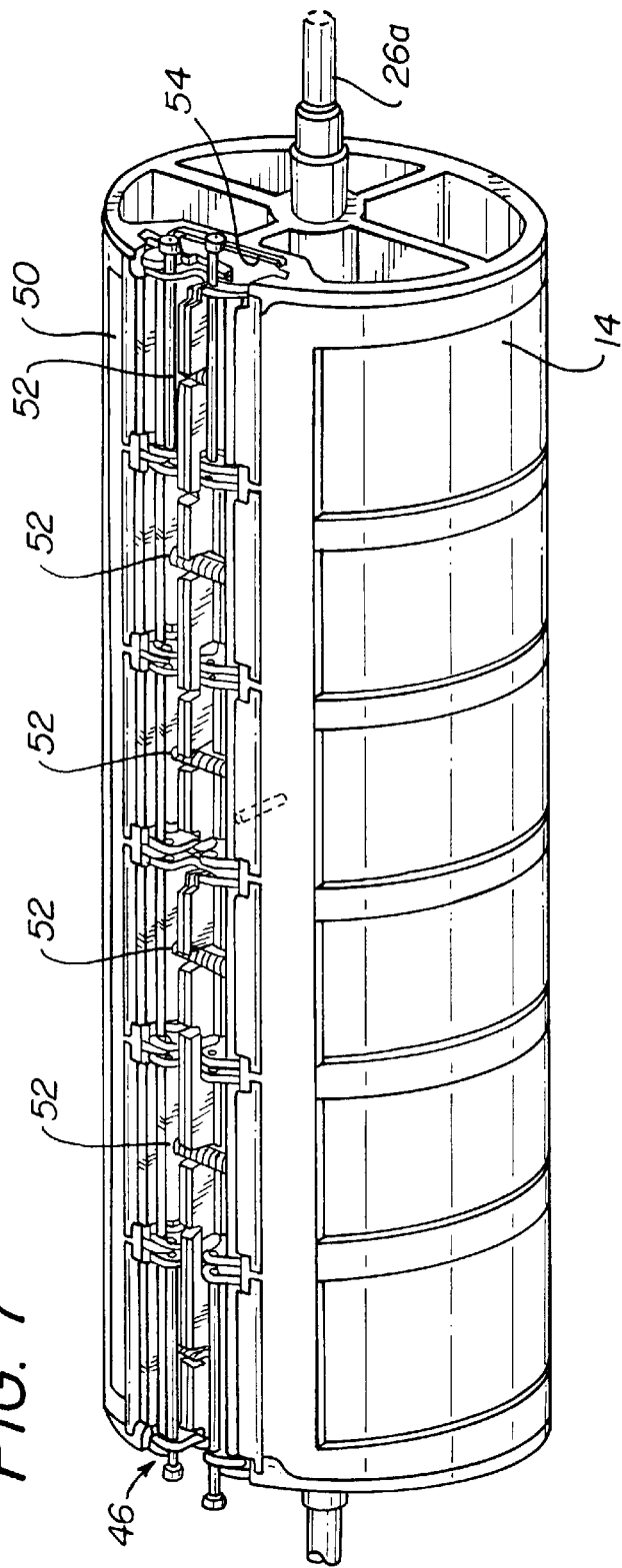
FIG. 7 is a perspective view of a print drum assembly showing the relieved surface of the drum and the clamping arrangement in its assembled relationship.
Figure 10:
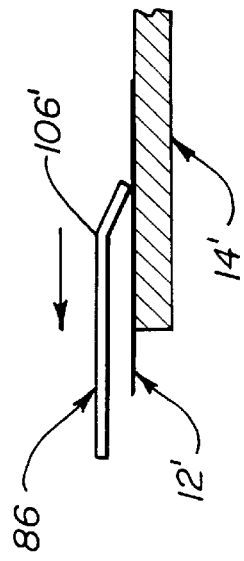

Reference is made to the accompanying drawings for purposes of illustrating an embodiment of an apparatus generally designated by reference numeral 10 for clamping and maintaining a flexible sheet medium 12 (FIG. 7) having leading and trailing edges 13L and 13T and right and left lateral marginal edges 13R and 13L in a wrapped position.

The apparatus 10 includes a high speed rotary drum 14 upon which is the sheet is to be rotated at very high rotational speeds, such as in the order of about 1200–6000 rpm, while the sheet is being imprinted in a printer mechanism designated 16, by an axially movable laser writing mechanism 18, such as the type described in a commonly-assigned U.S. Pat. No. 5,159,352. While this embodiment is concerned with laser printing of a flexible sheet medium 12 in a printer, it will be understood that the clamping principles of this invention can have other applications. The flexible sheet 12 can be of a thermographic dry laser imaging type, such as is commercially available from Polaroid Corporation of Cambridge, Mass., USA. More specifically, the film can be like that described in commonly-assigned U.S. Pat. No. 5,155,003. The sheet can have a dimension of 14×17 inches. However, this invention is not limited to such type of film medium or the noted size thereof.

Figure 1:
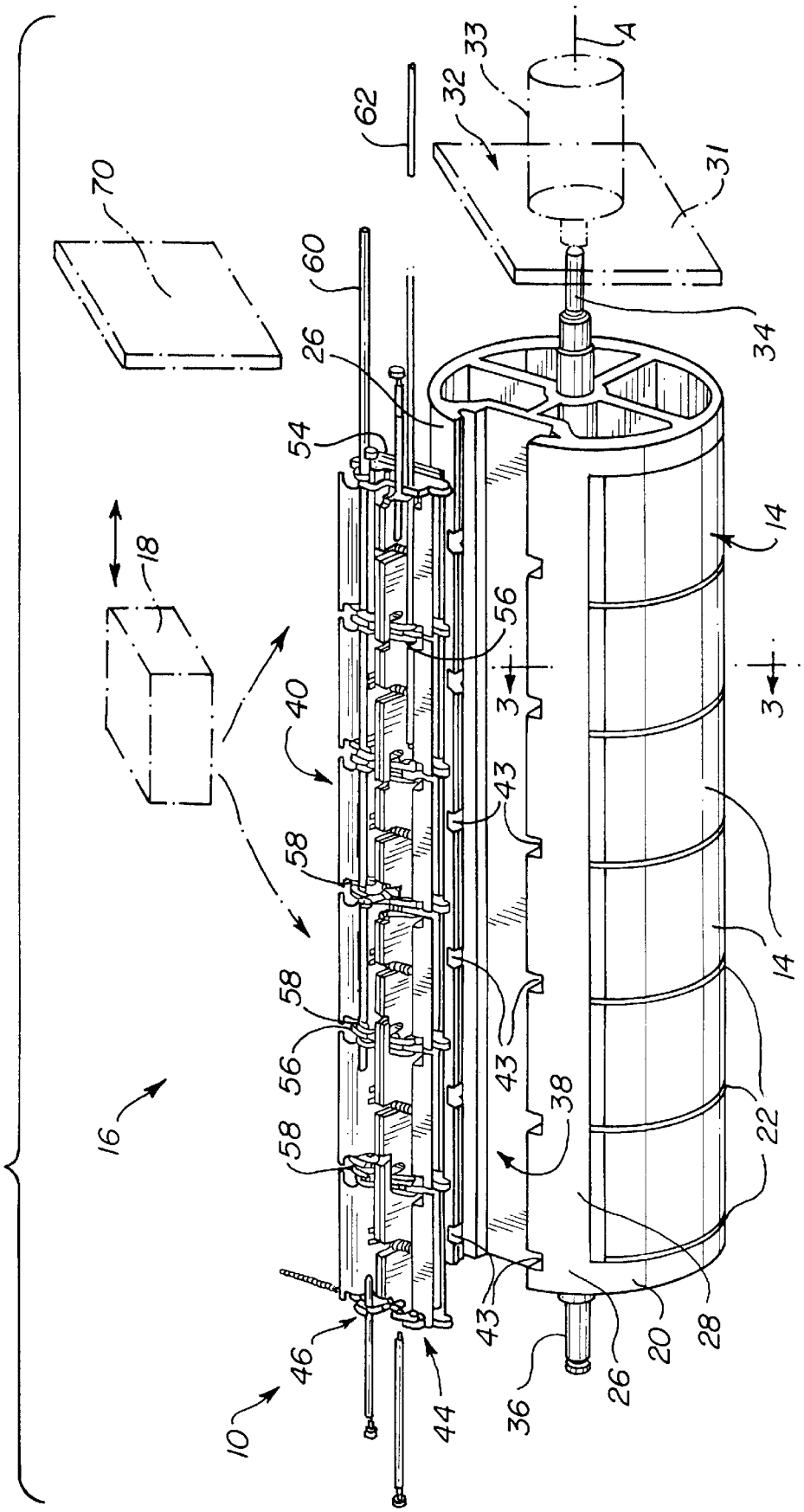
FIG. 1 is an exploded perspective schematic view of a printer mechanism illustrating relieved support surface of the present invention.
Figure 2:
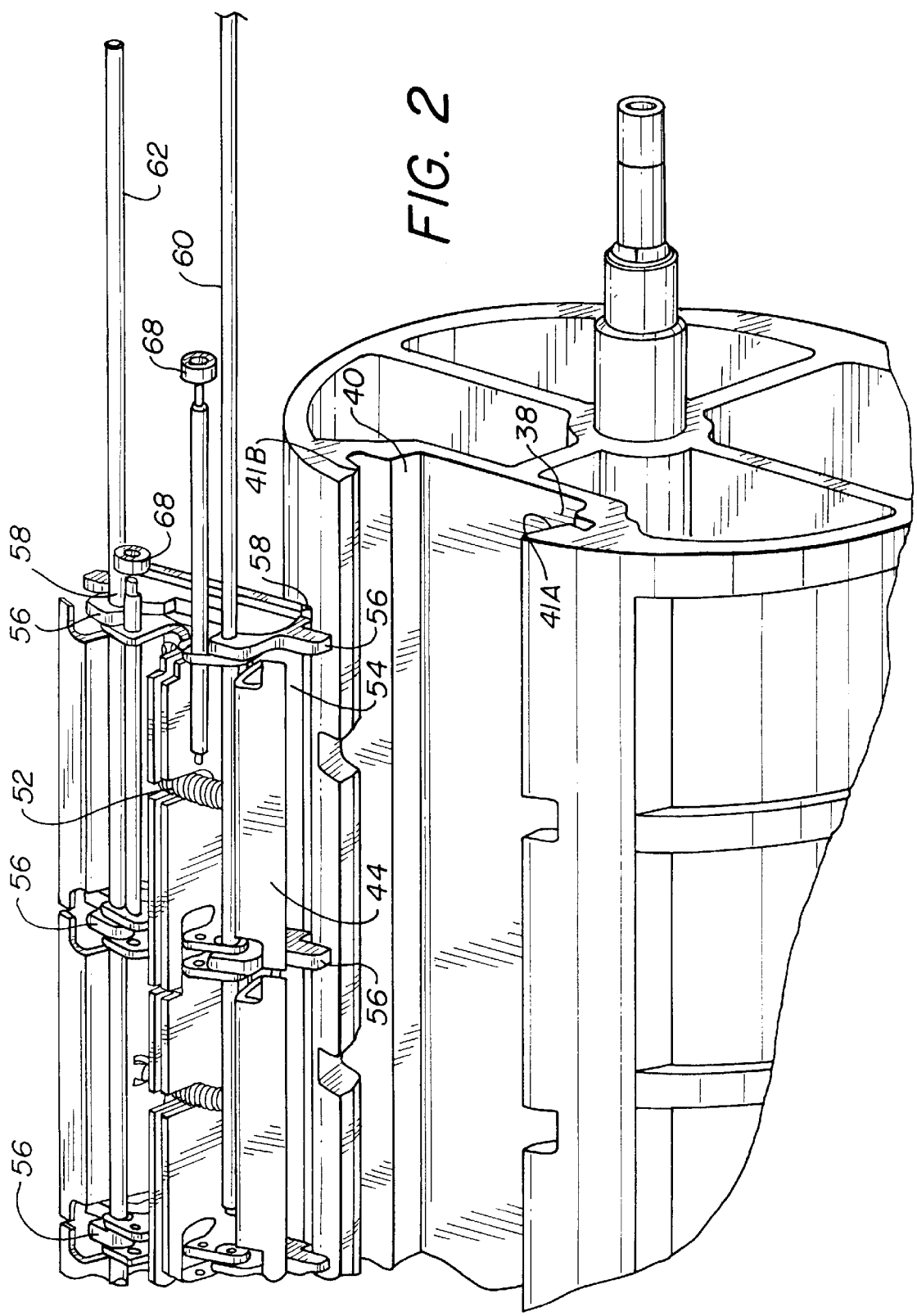
FIG. 2 is an enlarged and fragmented perspective view of the print drum and clamping assembly of the present invention.
Figure 3:
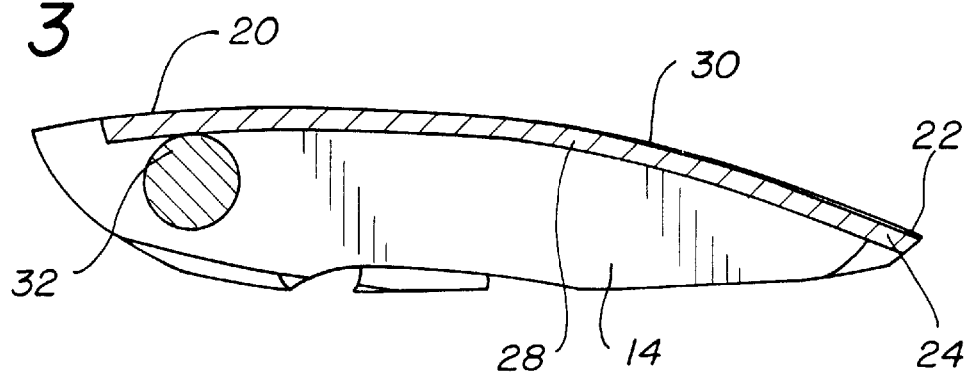
FIG. 3 is an enlarged fragmentary side sectional view of the relieved support surface of the drum illustrating the land areas, the transition to the recessed surface and the ribs taken along line 3—3 of FIG. 1.
Figure 4A:
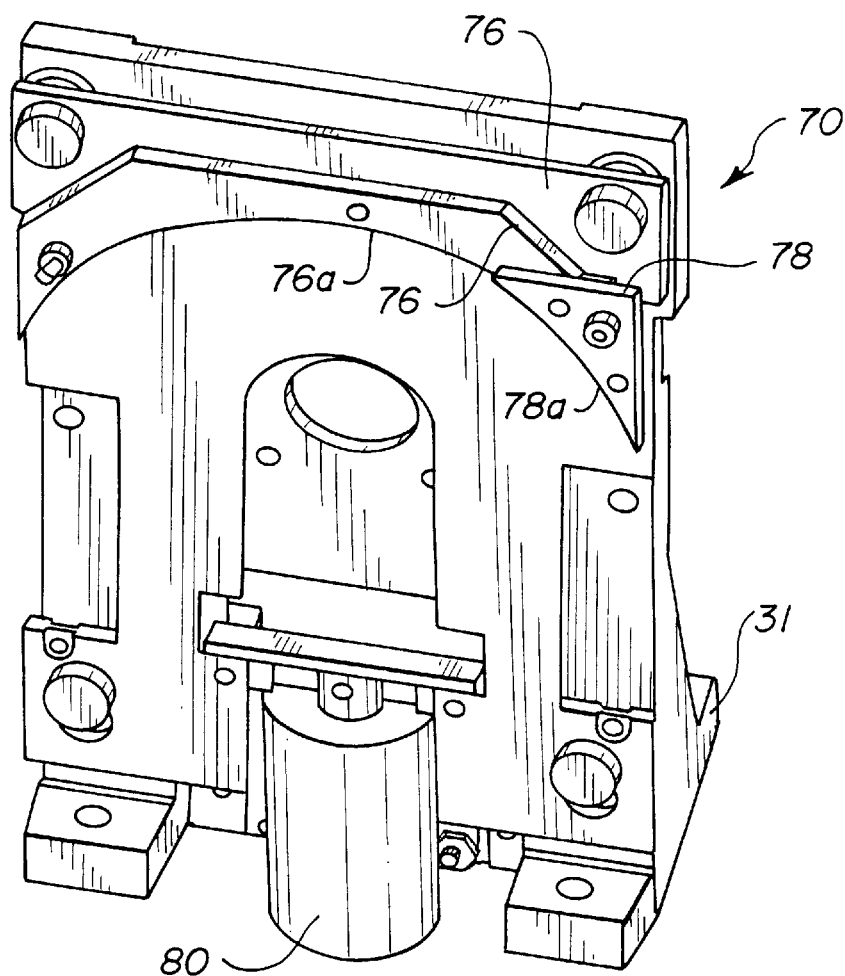
FIG. 4A is a perspective view of a drum endplate assembly carrying a cam mechanism.
Figure 4B:
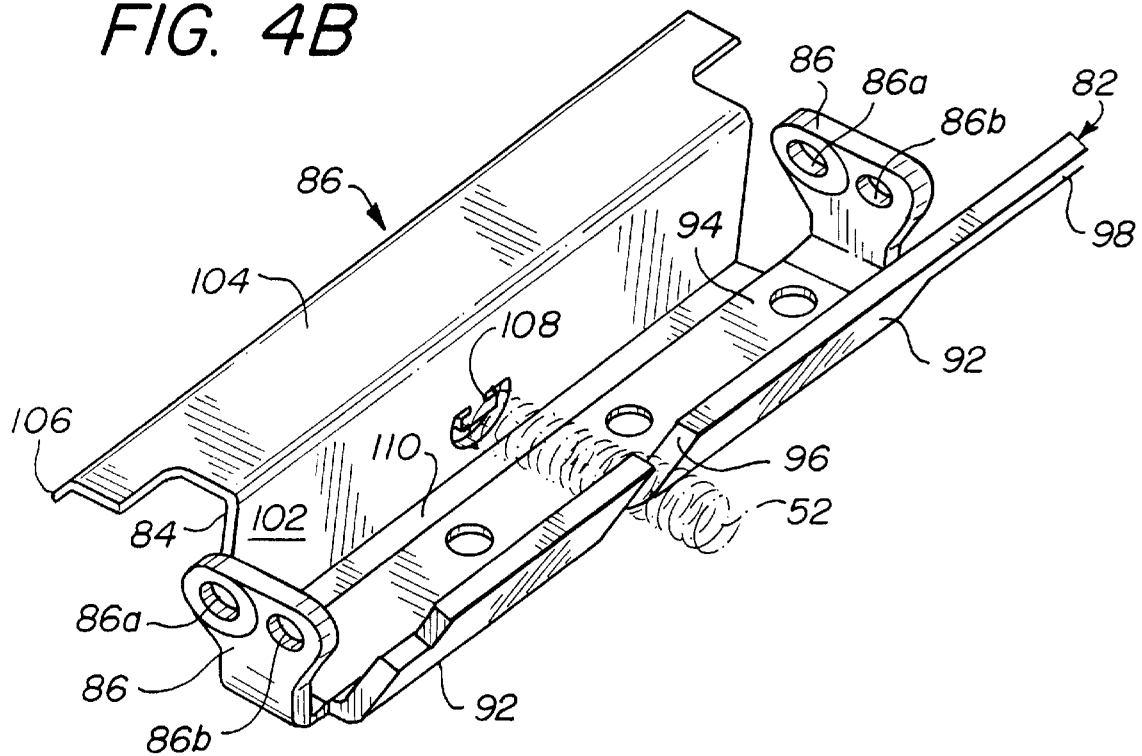
FIG. 4B is a perspective view of a clamp mechanism of the present invention.
Figure 5:
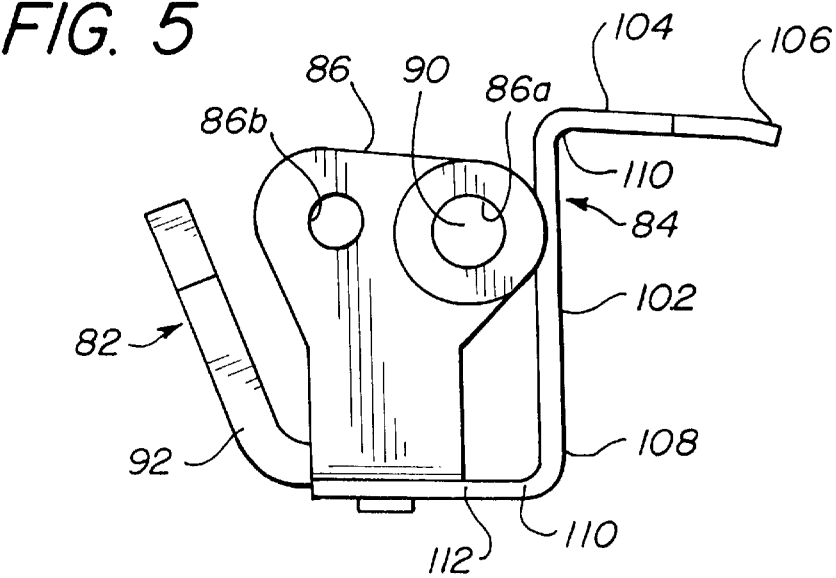
FIG. 5 is an end view of the clamp shown in FIG. 4B.

As more clearly shown in FIGS. 1–3, the printer mechanism 16 includes the rotary drum 14 having a relieved cylindrical sheet receiving and supporting surface 20 upon which the flexible sheet medium 12 is to be wrapped and supported during printing.

Figure 8:
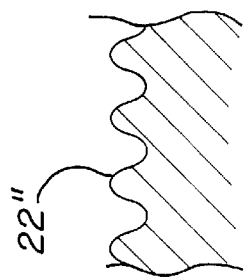
FIG. 8 is a fragmented elevation view of a different embodiment of ribs.

The relieved surface 20 includes a plurality of upstanding circumferential ribs 22, intermediate recessed areas 24; transverse lands 26 and interconnecting tangential ramps 28. The ribs 22 are divided into groups, namely left and right marginal ribs 22L and 22R corresponding to marginal edges 13L and 13R of the medium, respectively, and intermediate ribs 22I. Each rib 22 includes a relatively narrow circumferential support area 30. Likewise, the lands 26 (sometimes designated 26L and 26T corresponding to the respective leading and trailing edges 13L and 13T of the medium) have a transverse end support areas 32 for the corresponding or leading and trailing edges of the medium 12. The circumferential support areas 30 and the end support area 32 in the illustrative embodiment lie on a cylindrical surface spaced above the recessed areas 24. The spacing S between the support area surface and the recess surface is in a range of several thousandths of an inch. For instance, the range is from about 0.007 to about 0.017 inches. Other ranges can be used consistent with the teachings of the present invention. The total surface area 30 of the ribs 22 in contact with the medium 12 is, preferably, in a range of about 1 to about 8 percent of the total image field area of the medium 12, e.g., each rib represents about 0.125 percent and 0.7 percent of the total of such support area. While the foregoing range is preferred, it will be appreciated that other ranges can be used which are able to adequately reduce the dirt which can accumulate on the drum so as to reduce greatly the potential of dirt artifacts occurring. Accordingly, only a small portion of the total surface area of the medium 12 touches the drum 14; and sensitivity of the drum to dirt particles which may adhere to the drum 14 or the medium 12 is significantly reduced. Any dirt particles which may be present in the environment and which adhere to the drum or medium will most likely be evenly distributed. The result is that the probability of dirt contamination in the support area 24 is reduced to about the proportion of that area to the total area being supported. Alternatively, a continuous projection may be provided in the form of a helical structure, the ribs being portions of said helical structure. While a continuous rib is shown, the ribs can be discontinuous in construction. As seen in FIG. 8, the rib 22' has a curved cross-sectional profile so as to increase the likelihood of dirt falling onto the recessed skin. As illustrated, the ribs in this embodiment are spaced closer together than in the last embodiment. The closer spacing reduces film sagging between the ribs, such as when the film is wrapped too tightly. In this regard, the rib widths may be proportionally reduced to maintain the low surface area noted above.

The lands 26 support the medium 12 near the corresponding leading and trailing edges 13L and 13T. The medium 12 is secured in position on the drum 14 as hereinafter described. The ends of the medium are held in intimate contact with the lands 26 to thereby restrict air flow under the medium 12 during rotation of the drum, and to reduce the air turbulence around and about the medium as it is rotated.

The transitional ramp areas 28 form a smooth tangential transition between the lands 26 and the recessed areas 24. The ramps 26 facilitate feeding or loading the medium 12 onto the drum 14 without the leading edge 13L stubbing on the drum as might occur if the transitions between the lands and the recessed areas are made without the ramps, for example, if a square edge were present.

The rotary drum 14 is mounted for high speed rotation on journal bearings located in endplate 31 (one of which is shown) forming part of the printer frame assembly 32. An electric motor 33 is mounted on the frame assembly 32 and is appropriately coupled to a drum motor shaft 34 so as to drive the drum 14 about a central rotational axis A at the high speeds desired. In an illustrated embodiment, the rotary drum 14 is balanced for facilitating desired high speed rotation and the relieved cylindrical supporting surface 20 is precisely machined so that a wrapped sheet 12 can be evenly supported in a preferred wrapped position.

An encoder shaft 36 extends from the other end of the rotary drum so as to facilitate controlling angular orientations of the drum, which control operations do not form part of the present invention. In this illustrated embodiment, the rotary drum 14 includes a clamp assembly mounting channel 38 extending along its axial extent for securely and removably receiving therein a centrifugally actuated clamping assembly 40. Details of such clamping assembly are set forth adequately in U.S. Pat. No. 5,516,096. The mounting channel 38 is provided with a guide recess in each of the opposing channel sidewalls, respectively. A plurality of axially spaced receiving notches 43 are formed along each channel sidewall for slidably cooperating with the centrifugally actuated clamping assembly 40, in a manner to be described.

Figure 6:
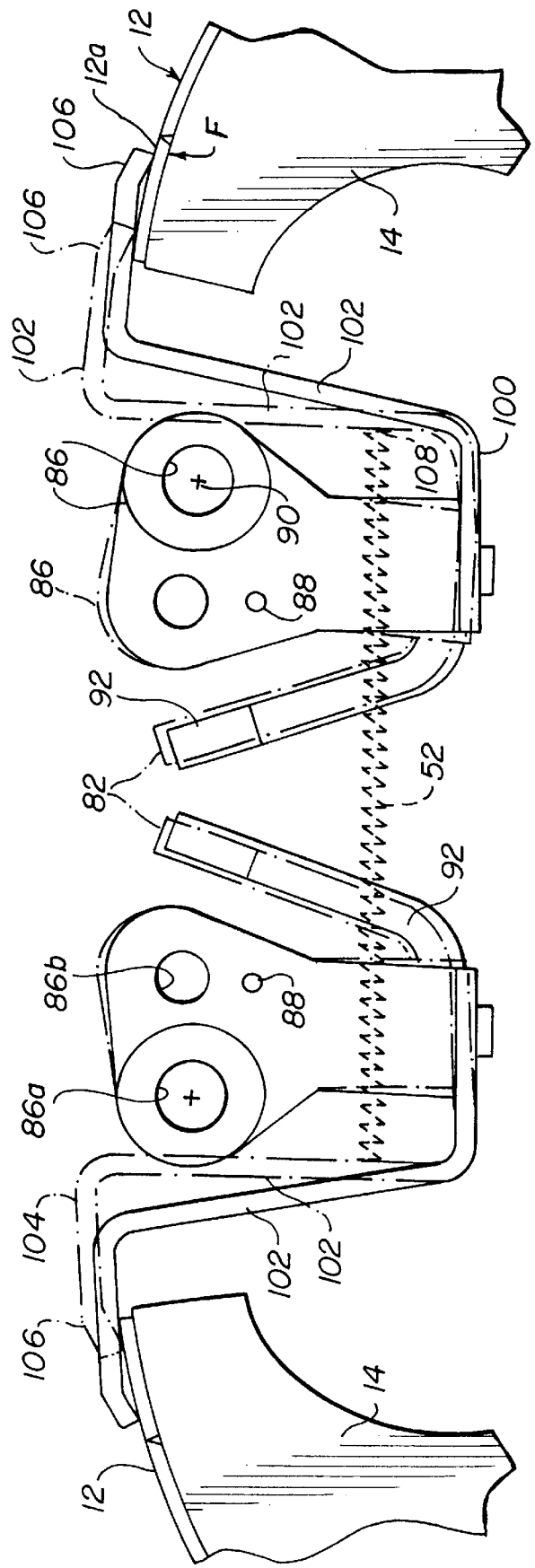
FIG. 6 is an enlarged and fragmented end view of the clamp mechanism of the present invention.

Reference is now made to FIGS. 1, 2 and 6 for describing the centrifugally actuated clamping assembly 40. Included in the clamping assembly 40 is a plurality of axially aligned and spaced apart pairs of leading and trailing edge clamps 44 and 46 for clamping leading and trailing sheet edges 48, 50, respectively. The clamping assembly 40 also includes a tension spring 52 connected to and between each pair of leading and trailing clamps 44 and 46 in order to bias them to their normally closed positions, see FIG. 7. In this illustrated embodiment, the clamping assembly 40 is a generally thin rectangular clamp baseplate 54 which extends along the length of the channel 38 and can be fixedly attached to the rotary drum 14. A plurality of vertical supports 56 are attached to the baseplate 54 in axially spaced apart relationship to each other to support therebetween a pair of the leading and trailing clamps 44 and 46. The vertical supports 56 have a pair of openings 58 (FIG. 1). Each opening 58 is located in a lateral ear 58a and removably receives therein an elongate pivot shaft 60, 62, respectively, for pivotally supporting the clamps. Each of the support ears 58a can slide within a respective guide recess 34, 36 to retain the clamp assembly and cooperates with the notches 43 to retain the clamp assembly. However, other forms of mounting the clamps to the drum are contemplated and the above arrangement is for purposes of illustration. The pivot shafts 60, 62 are adapted to pivotally mount each of the leading and trailing edge clamps 44, 46, respectively, to the vertical supports. Each of the outermost axial pair of clamps is adapted to cooperate with a cam follower shaft 66. Each of the shafts 66 has a cam roller 68 at its distal end which protrudes beyond the end of the rotary drum 14. The cam rollers 68 are to be selectively displaced radially inward relative to the drums axis upon engagement and downward movement by a cam mechanism generally designated by reference numeral 70.

There is a camming mechanism 70 located at each end of the rotary drum 14, only one of which is shown in FIGS. 1 and 3, for engaging the axial cam rollers 68 in a manner to be described. In this regard, the camming mechanism 70 is mounted on the machine endplate assembly 31 which, as noted, is apertured and journalled to rotatably receive one end of the drum shaft. A slider 74 is mounted on the endplate assembly 31 for vertical movement between camming and non-camming positions. The slider 74 has mounted thereon an arcuate camming member 76 having a camming surface 76a which is adapted to engage one set of the cam rollers 68 associated with the leading edge clamps. A camming member 78 is fixedly mounted on the camming member 76, as shown in FIG. 3. The camming member 78 has an arcuate camming surface 78a which is adapted to engage the other set of cam rollers 68 associated with the trailing edge clamps. A solenoid assembly 80 is coupled to the slider 74 and is actuated to vertically move the latter between its camming and non-camming positions. It should be noted that the camming surfaces are in different planes and the cam rollers of the leading and trailing clamps are spaced at appropriately different axial distances from the end of the drum. This allows the camming surfaces 76a, 78a to independently engage their respective clamping rollers 68 so that the leading and trailing edge clamps are operated independently of each other. It will be understood, that the opposite terms leading and trailing are relative and that the opposite terms can be applied to these clamps. Such movement will cause the clamps to pivot from their clamping position shown to their open condition (not shown). Further in this regard, the drum will be stopped at angular positions to achieve the foregoing independent actuation. The camming mechanism 70 does not, per se, form an aspect of the present invention, since other arrangements can be provided for opening the leading and trailing edge clamps independently of each other. It should be noted that whenever the cam mechanism 70 and the drum are not moving in the non-camming position, the clamp springs 52 are operative to drive both the leading and trailing clamps to their normally closed or clamping positions.

Reference is now made to FIGS. 4A–6 for describing the clamps. The clamps do not, per se, form an aspect of the present invention. Only, those details necessary to understand the clamp with the drum combination for minimizing out-of-focus printing will be set forth. In the illustrated embodiment, each clamp of every pair is the same as the other clamp of the same pair but this need not be the case. However, the middle pair of clamps is structured differently from those at axial ends for reasons which will be described. Each axial end pair of clamps, only one is illustrated for purposes of clarity, presents a counterweight segment 82, a clamping segment 84, and a supporting segment 86 which are the sides of the counterweight and which extends upwardly from axial ends of the counterweight segment. The supporting segment 86 has aligned shaft openings 86a and cam shaft openings 86b. Since these are centrifugally actuated clamps, it should be noted that whatever clamp configurations and materials are selected, consistent with the teachings of this invention, the center of gravity of each clamp is spaced from the clamps pivot axis 90 to provide the desired clamping forces. In this regard, the further the clamps center of gravity is from its pivot axis, the higher the clamping forces which are exerted.

With continued reference to FIGS. 4A–6, the counterweight portion 82 is a relatively rigid and elongated member made of, for instance, steel and having a generally inclined and upstanding portion 92 and at a proximal end a flat base 94. The base 94 has integrally formed at its opposite ends the segments 86. The inclined portion 92 also has a centrally located recess 96 which accommodates the spring 52 so that the latter can move freely relative to the former during pivoting. In addition, the inclined portion 92 has an axial tab 98 which is arranged to contact and drive the adjacent clamp to its open condition. In this manner, the end most clamp will drive its adjacent innermost clamp by the tab 98. In turn, the adjacent innermost clamp also has a tab 98 which engages and opens the middle clamp. Thus, all the clamps will be operated to open when the camming mechanism engages the cam roller associated with a particular set of clamps in response to actuation by the camming mechanism 70. The inclined portion 92 of one clamp will not, however, contact the inclined portion 92 of the adjacent clamp of its pair during pivoting movement, see FIG. 6.

Reference is made to the clamping segment 84 which has a base beam 100, an upright deflecting beam portion 102, and a claw or sheet engaging portion 104 having a downwardly directed claw tip 106. The claw tip 106 is dimensioned to extend over a tab portion 12a of the sheet. In this embodiment, the radius of the claw tip 106 is smooth, deburred and polished. An advantage at such a surface on the claw tip 106 is that, it allows the clamp tip to slip relative to the film and firmly urges the sheet onto the drum surface (See FIG. 6). This relationship has the advantages of not too tightly pulling the sheet an unacceptable amount into the recesses between adjacent ribs and holding the sheet stationary on the drum. Because of this clamp sliding relationship, the clamped sheet profile on the drum has a configuration which increases the likelihood of the autofocus following the sheet profiles.

Another advantage of the slipping is that it compensates for circumferentially clearance problems between the clamp and its pivot rod and the pivotal and drum. Even though a highly smooth claw tip is described, the invention contemplates using a claw tip with a roller for facilitating the sliding action. For that matter, other constructions are contemplated for allowing the claw tip to slide relative to the surface of the sheet.

Referring back to FIGS. 4A–6 a recessed tab 108 is present in the upright position 102 and has one end of the spring 52 attached to it. The other end of the spring is attached to a tab which is on the other clamp of the pair, see FIG. 6. The sheet clamping segment 84 can be made of a variety of materials and in this embodiment is made of steel. The segment 84 is dimensioned to be relatively lighter than the counterweight segment 82. Whatever materials and dimensions are selected for the clamping segments should allow it to deflect relative to the counterweight segment when subjected to the clamping forces applied to its claw, as will be described. As earlier indicated, this invention makes provision for the clamping segment 84 deflecting toward the pivot 90, as shown in FIG. 6. This deflection is caused by the reaction forces F of the drum being applied on the claw tip 106 which reaction forces are in opposition to the clamping forces caused by the centrifugal forces acting at the center of gravity of the clamp. It may then be seen that the centrifugal forces cause the claw to bear against the sheet and the drum. Specifically, the base 100 and the upright 102 deflect as seen in FIG. 6. Such deflection is effective to displace the claw tip toward the pivot 90. The clamping acts to maintain the film tightly wrapped on the drum and counteracts the tendency of the sheet to otherwise separate and buckle relative to the surface 20. The clamping force generated can be selected to maintain the sheet in its preferred wrapped position relative to the laser head. The advantages of this are that the clamping inhibits the dynamic centrifugal clamping forces acting on the clamp in such a manner as would otherwise cause the claw to defect such that tip and sheet moves away from the pivot to cause the sheet to thus deviate unacceptably from its precision wrapped position. It will be appreciated that the clamping forces of the claw increase as the centripetal acceleration forces increase and drive the center of gravity about the axis 90 in the clamping direction.

Accordingly, the reaction forces increase as the centrifugal forces of the clamp increase due to drum speed increases. Thus, the clamping can be regulated by controlling the geometry of the portions of the clamps as well as the mechanical properties of their components as described in the above-noted application.

Figure 9:
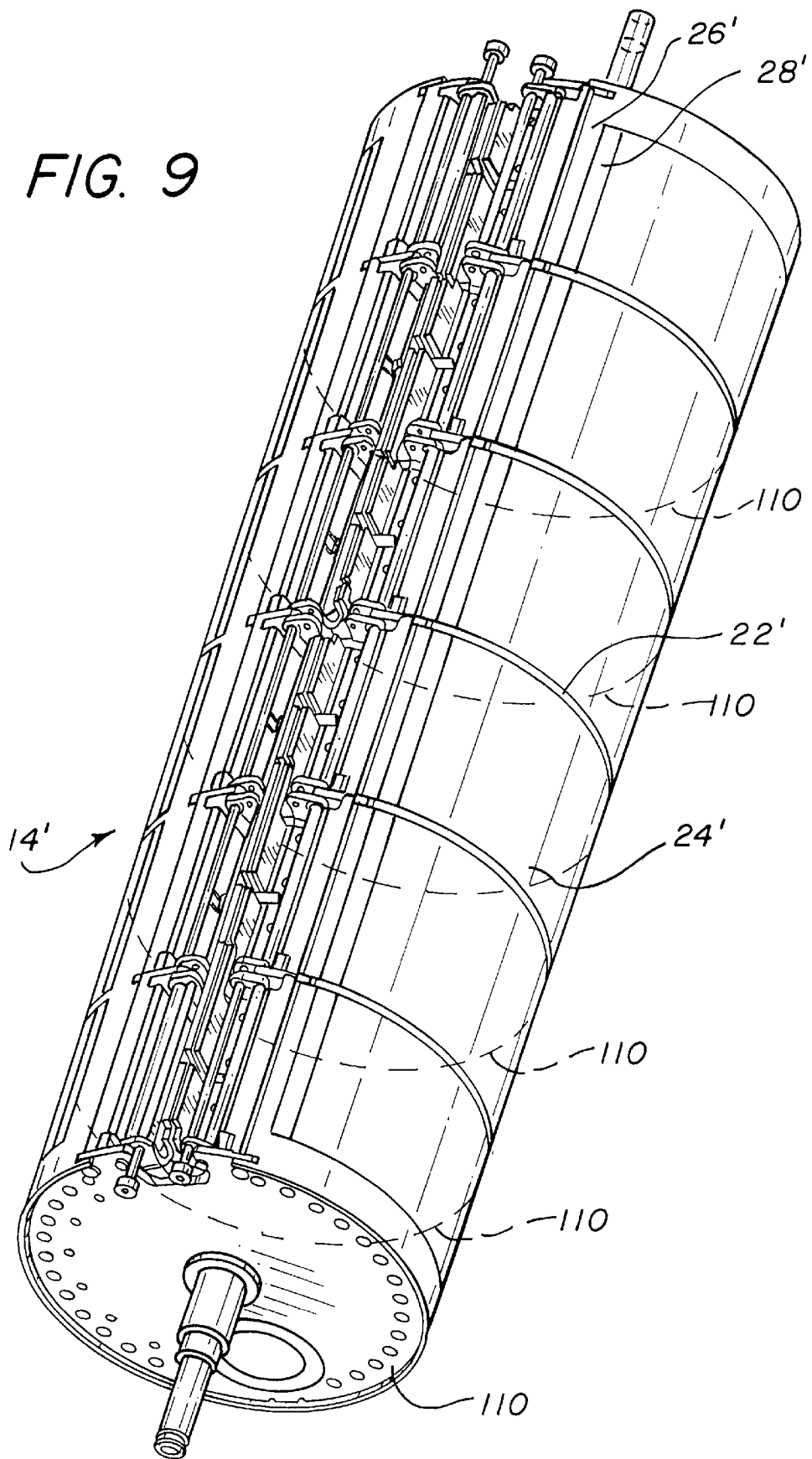
FIG. 9 is a perspective view of another preferred embodiment of a print drum assembly of this invention; and, FIG. 10 is diagrammatic view of a clamp mechanism acting on the film and drum.

Another embodiment of the drum 14 is illustrated in FIG. 9. In this embodiment, like structure is indicated by like reference numerals with however, the addition of a prime marking. This embodiment essentially differs from the preceding one by virtue of the fact that instead of the drum being extruded and then having the ribs machined, the drum 14' is comprised of a plurality of axially separated disks 110 which have a thin, preferably aluminum, skin wrapped around and brazed to the periphery of the disks 110. The skin 112 carries the ribs 22', lands 26' and transition ramps 28'. The ribs, lands and transition ramps can be formed by machining. The clamping assembly can be suitably secured to the rotary drum.

The present invention may be embodied in other specific forms without departing from the spirit or essential characteristics thereof. The present embodiments are, therefore, to be considered in all respects as illustrative and not restrictive. The scope of the invention being indicated by the appended claims rather than by the foregoing description and all changes which come within the meaning and the range of equivalency of the claims are therefore intended to be embraced therein.

What is claimed:

1. An apparatus for securing a flexible sheet medium on a rotatable print drum comprising:

a relieved support surface formed on the drum including a plurality of ribs and recessed areas therebetween for supporting said flexible sheet medium thereon; and means for applying securing forces to the sheet so as to selectively maintain the sheet in a position wrapped position;

wherein said means for applying securing forces includes a centrifugally operable clamping mechanism having a pivot axis, whereby the securing forces are applied to at least one edge of the sheet and which increase as the rotational speed of the support surface increases, such that said applying means will not bend or push the sheet edge away from the pivot axis during rotation so that the sheet is unacceptably displaced from the precision wrapped postion;

wherein said clamping mechanism includes means for engaging and slipping relative to the sheet surface during clamping.

2. Apparatus for securing a flexible sheet medium on a rotatable supporting surface; said apparatus comprising:

a rotatable drum which is generally cylindrical with upstanding ribs and intermediate recessed areas, said ribs providing a support surface upon which a sheet medium is to be wrapped for being imprinted;

centrifugally actuated clamping means mountable on said drum and being operable for pivotal movement on said rotatable drum and having a center of gravity which is laterally offset from a pivot axis of said clamping means;

said clamping means having a sheet clamping portion with a distal end portion, said end portion directly clamps a sheet medium to said support surface as said clamping means is pivoted about the axis to a clamping position;

said sheet clamping portion also being constructed of compliant material so that as said clamping portion clamps a sheet medium with greater force as a result of increasing centrifugally actuated forces, said clamping portion maintains the sheet medium in its intended secured position on said support surface; said clamping portion including a means for allowing it to slip relative to the surface of the sheet medium.

3. The apparatus of claim 2 wherein said clamping slip means includes a smooth surface for facilitating such slippage.

* * * * *